O. R. MITCHELL.
CLUTCH.
APPLICATION FILED OCT. 8, 1906.
905,209.
Patented Dec. 1, 1908.
2 SHEETS—SHEET 2.
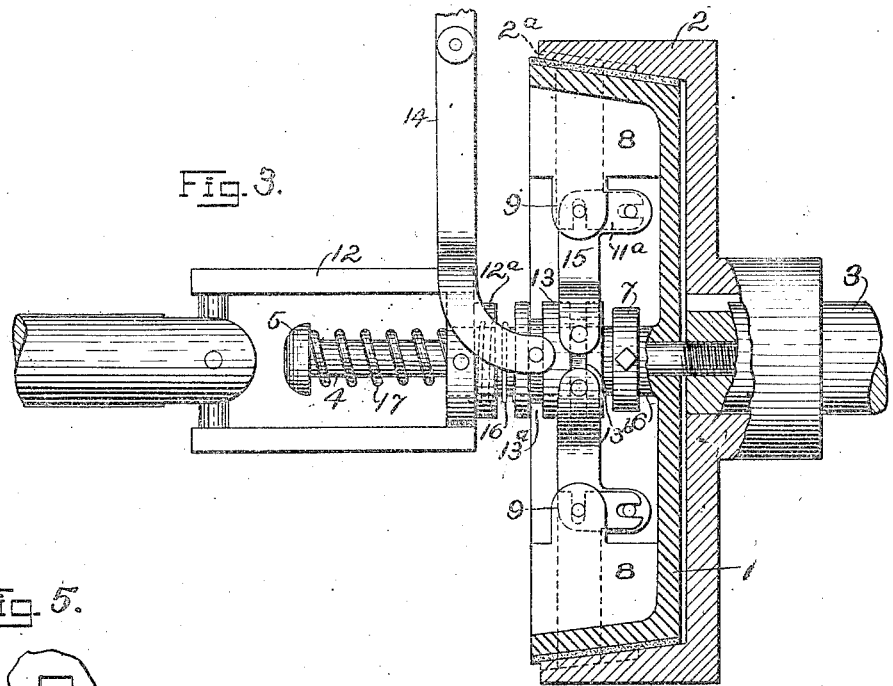
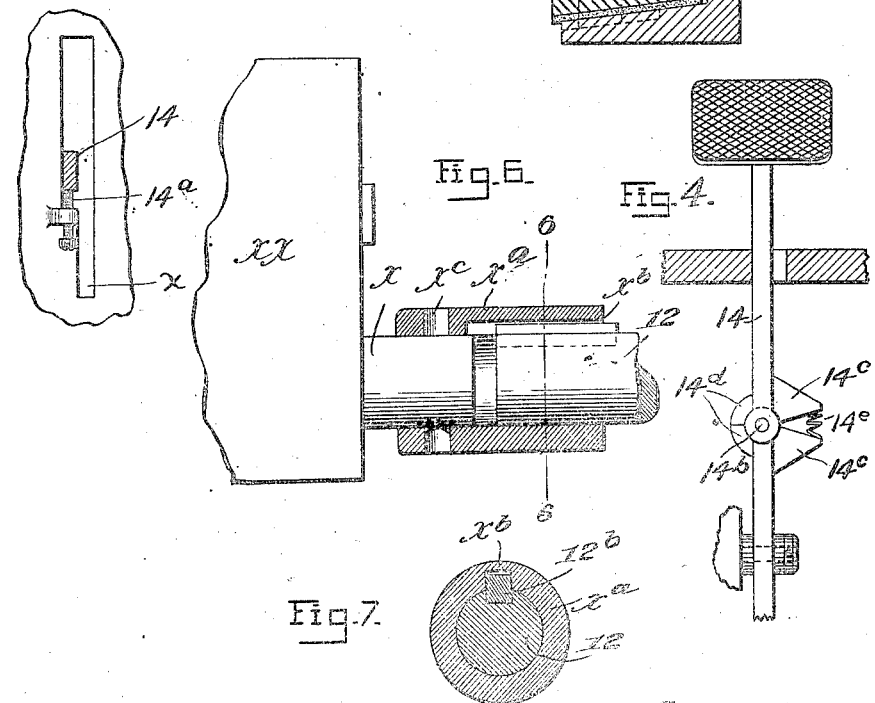
Witnesses:
Inventor:

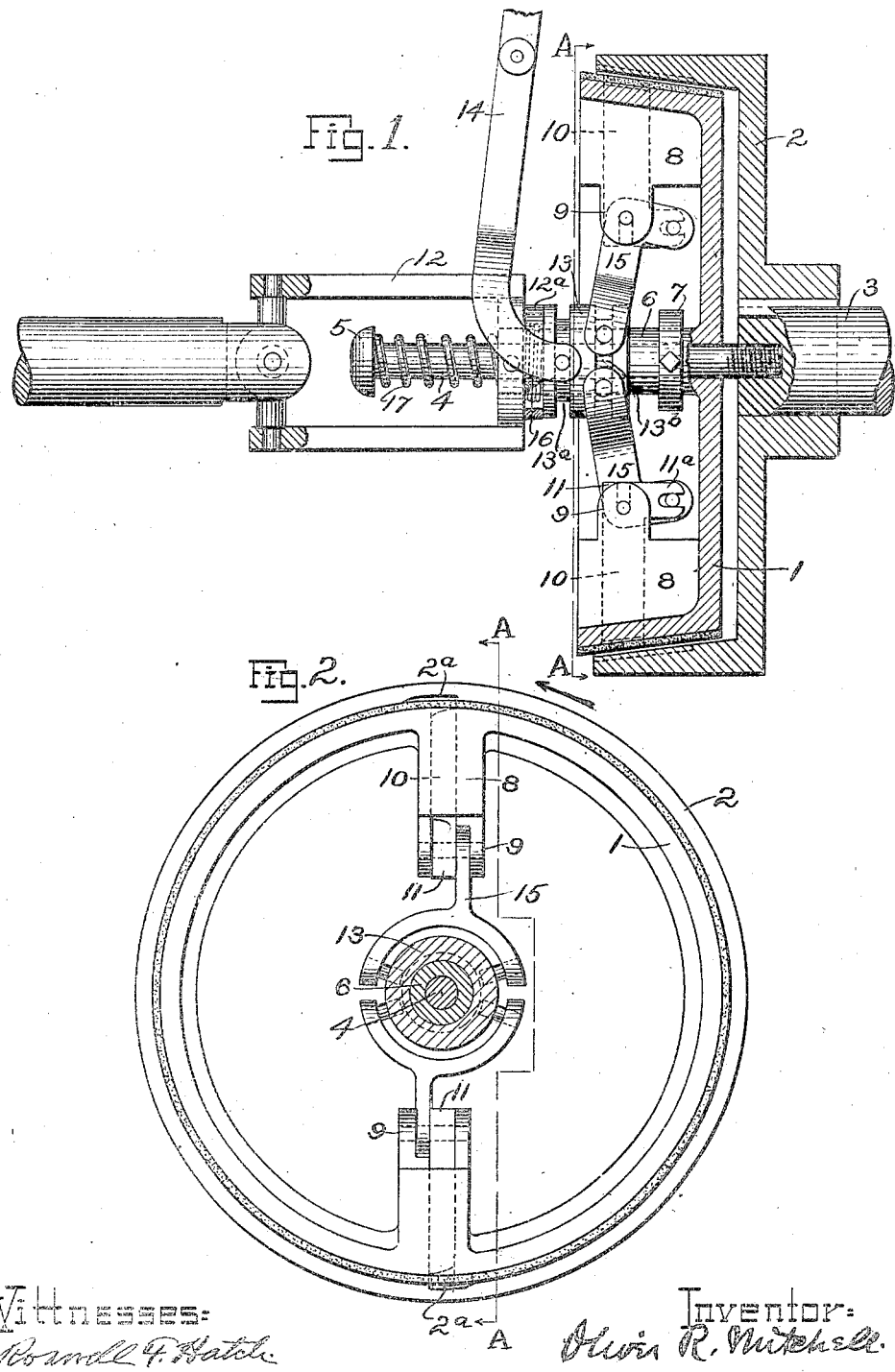

UNITED STATES PATENT OFFICE.

OLIVER R. MITCHELL, OF BOSTON, MASSACHUSETTS.

CLUTCH.

No. 905,209.

Specification of Letters Patent.

Patented Dec. 1, 1908.

Application filed October 8, 1906. Serial No. 337,853.

*To all whom it may concern:*

Be it known that I, OLIVER R. MITCHELL, a citizen of the United States, and resident of Boston, in the county of Suffolk and State of Massachusetts, have invented new and useful Improvements in Clutches, of which the following is a specification.

My invention is an improved clutch for use in connecting a source of power with the mechanism to be driven, and is shown in the drawings as adapted for use in connecting a motor of an automobile with the transmission shaft through which and its connections the driving wheels of the automobile are actuated.

My improvement is shown as adapted to a cone clutch of the ordinary type but may be adapted to other forms of clutch.

The ordinary clutch, of the purely frictional type, whether a cone clutch or other kind, is subject to the difficulty that by wear or by accidental oiling of the frictional surfaces or from other causes the clutch may become ineffective to transmit the full power of the motor with the result that the clutch member which is connected to the motor or motor shaft (in the drawings this clutch member is shown as the fly wheel of the motor), slips upon the other clutch member with more or less rapidity, wearing the friction surfaces and developing heat to the detriment of the friction surfaces, and giving service more or less ineffective.

The object of my invention is to overcome this difficulty by providing a positive locking engagement between the clutch members which will become effective when required, and which positive locking device may be put into operation without undue shock by permitting the frictional engagement of the two friction clutch members to fully take place so that the two clutch members revolve nearly or quite in unison before the locking device is permitted to become operative.

Another object is to provide means whereby the positive lock is withdrawn before the friction members can be disengaged.

In the drawings: Figure 1 is an elevation, partly in section, on line A—A of Fig. 2, looking in the direction of the arrows, showing my improved clutch in disengaged position; Fig. 2 is an elevation, partly in section, on the line A—A of Fig. 1; Fig. 3 is similar to Fig. 1, but showing the clutch in engaged position; Fig. 4 is a view of the clutch pedal; Fig. 5 is a view of the clutch pedal slot; Fig. 6 is a detail showing a spline and slot connection between the universal joint member 12 and the transmission shaft X. Fig. 7 is a cross section on line 6—6 of Fig. 6.

In the drawings 1 is the inner member of the cone clutch and 2 is the outer member of the cone clutch which consists of the fly wheel of the motor, having a suitable conical interior surface within the flange of the fly wheel.

3 is the main driving shaft of the motor to which the fly wheel 2 is firmly secured, and 4 is a projection of the motor shaft 3 passing through the fly wheel and projecting as shown. Upon the extreme end of this projecting shaft 4 is an abutment 5 secured thereon in any suitable manner. Loosely mounted upon the shaft projection 4 is the inner cone member 1 with its hub projection 6. At diametrically opposite sides of the clutch member 1 and within the same are integral blocks 8 having projecting lugs 9. Through this block 8 is formed a passage 10 within which works a bolt 11. It is obvious that the number of these bolts and the blocks within which they are mounted may be more or less than two as may be desired, but I have shown two of these blocks and bolts as a suitable embodiment of my invention.

To the outer end of the hub projection 6 is firmly secured one member of a universal joint 12 and longitudinally movably mounted upon the hub projection 6 is a sleeve 13 shown in the drawings as provided with two circumferential grooves 13ᵃ, 13ᵇ within one of which is arranged an actuating pin or pins controlled by the movement of a lever 14 to be operated by the driver of the car, and within the other of which is a pin secured to one end of the bell crank lever 15 pivotally mounted upon the lug 9, the other end of the bell crank lever being slotted and engaging a pin which is fast to a projection 11ᵃ upon the bolt 11. Between the abutment 5 and the inner end of the joint member 12 which is secured upon the end of the hub extension 6, is mounted a spiral spring 17 surrounding the shaft extension 4. It will be obvious that when the clutch member 1 and its attached parts are shifted away from the clutch member 2, this spiral spring 17 will be compressed and that when the force which accomplishes this shifting of the clutch member 1 is released, the spiral spring will throw clutch member 1 in the opposite direction and force it into engagement with clutch member 2 and continue to hold it in engagement until the two members are again forced apart by means of the lever 14. Upon one side of the inner end of the joint member 12 is a cup 12ª and within this cup and mounted around the hub extension 6 is another spiral spring 16, one end of which abuts against the inner end of the joint member 12 fast to the hub extension 6 and the other end of which abuts against the sliding sleeve 13. The spring 17 is of relatively far greater power than the spring 16 as is indicated in the drawings by the apparent difference in size of the two springs. The spring 17 having the function of holding the two members of the master clutch in engagement, is made as stiff and powerful as may be, having regard to convenient operation by hand or foot power, while the spring 16 whose function is merely to force forward the bolts 11 after the spring 17 has seated the inner clutch member 1, may be relatively weak and is in fact so much weaker than the spring 17 that when the pressure on lever 14 is reduced to allow the clutch member 1 to be gradually seated spring 16 will be kept compressed between the sliding sleeve 13 and the joint member 12 by the action of spring 17 until clutch member 1 is seated.

The operation is as follows: In Fig. 1 the clutch is shown as in disengaged position. The lever 14 has been operated to slide the sleeve 13 to the left and in so doing has compressed the spiral spring 16 within the cup 12ª until the edges of the cup 12ª come into contact with the end of the sliding sleeve 13. The motion of the lever 14 being continued, the sleeve 13 pressing against the cup 12ª forces the joint member 12 and the hub extension 7 to which joint member 12 is secured and the clutch member 1 to the left, thus disengaging the clutch members and compressing spring 17 at the same time. The universal joint 12 is connected to the transmission shaft X by a spline and slot engagement as shown in Figs. 6 and 7, or by some other suitable connection permitting longitudinal movement of one of the clutch members. The transmission gear case is indicated at XX. In these figures the sleeve Xª pinned to the transmission shaft X by the pin Xᶜ has a groove Xᵇ and the joint member 12, a key 12ᵇ in the groove Xᵇ. The preliminary motion of sliding sleeve 13 before the full compression of spring 16 and before the sleeve engaged the edge of cup 12ª actuated the bell crank lever 15 to withdraw the bolt 11 from engagement with the clutch member 2 and brought bolt 11 into retracted position shown in Fig. 1. So long as pressure is maintained upon the lever 14, the clutch members will be held in disengaged position with the bolts 11 withdrawn or retracted. When it is desired to reëngage the clutch members the lever 14 is released, the spring 17 will then force the universal joint member 12, hub extension 6 and clutch member 1 toward the other clutch member 2 until such an engagement is effected as stops further movement of clutch member 1 longitudinally upon the shaft extension 4. The spring 16 not being restrained from further expansion as is the spring 17 will now force the sliding sleeve 13 longitudinally along the hub extension 7 and the sliding sleeve 13 in this movement will operate the bell crank lever and force the bolts 11 outwardly until their ends engage the inner surface of clutch member 2 (see Fig. 3). If the bolt receiving slots 2ª upon the inner conical surface of clutch member 2 do not register with the outwardly spring pressed bolts, no engagement will take place and no engagement of the bolts with the slots 2ª will take place so long as the clutch members do not slip; but in case of any slippage of clutch member 2 upon the inner clutch member 1, when one half a revolution or less of the outer clutch member upon the inner clutch member is effected, according to the relative positions of the bolts and the slots 2ª, the bolts will be spring pressed into the slots and will lock the outer member against any further movement upon the inner member of the clutch.

It will be observed that the spring pressed bolts 11 cannot be pressed outward to engage the slot 2ª in the clutch 2 until the two clutch members 1 and 2 have been seated together and have become as frictionally engaged as they are capable of being, so that the relative movement, if any, of the two friction members will be slight and the subsequent engagement of the bolts with the outer clutch member when the bolts are permitted to move outwardly will be gentle. It will also be observed that before power can be applied to move clutch member 1 out of engagement with clutch member 2, the sleeve 13 must be moved longitudinally upon the hub extension 6, compressing spring 16 until the sliding member 13 engages the cup 12ª to force clutch member 1 out of engagement with clutch member 2, and in this movement of sliding member 13 the bell crank lever 15 must be operated and thus actuate the bolts 11 into retracted position so that the bolts 11 must be retracted before the clutch members 1 and 2 can be disengaged. On the other hand, when the clutch members 1 and 2 are being engaged it will be obvious that when pressure is relaxed upon the lever 14 the vastly more powerful spring 17 reacting from the abutment 5 will keep the joint member 12 and its cup 12ª pressed forward against the sliding member 13 until the engagement of the clutch member 1 with clutch member 2 takes the pressure of spring 17, whereupon spring 16 will be at liberty to expand and force the sleeve 13 along to operate the bell crank levers and bolts 11, thus making sure that the clutch members 1 and 2 shall be fully engaged before the bolts 11 can be put in position to lock the two members of the clutch together.

If it is desired the positive locking mechanism may be prevented from operating unless especially desired. In the drawings two ways of accomplishing this end are shown. In Fig. 5 is shown a stepped slot for the clutch lever, with an adjusting screw. This slot and adjusting screw are so arranged that the clutch lever 14 will engage the screw 14$^a$ only after clutch member 1 has engaged with clutch member 2. The stop 14$^a$ is adjustable to this end and prevents further movement of lever 14, thus holding spring 16 compressed and sleeve 13 in its outward position with bolts 11 retracted. When it is desired to allow the locking bolts to engage the clutch lever 14 is thrown to the right so that it may move backwards in the slot extension $x$ (see Fig. 5) thus permitting the actuation of sleeve 13 and its connected parts by spring 16. Another method of preventing the operation of the locking bolts, except as desired, is by adjustment of the ring 7 along the hub extension 6 to limit the movement of sliding sleeve 13.

The clutch pedal shown in Fig. 4 is jointed at 14$^b$ so that it may be forced to one side to enter slot extension $x$ (Fig. 5) and carries lugs 14$^c$ with a spiral spring 14$^e$ interposed to return it into normal position and also lugs 14$^d$ to prevent it from bending in the other direction.

I claim as my invention:

1. In a clutch, two main friction members, the driving member and the driven member, one member connected to one shaft and the other connected to another shaft; a sliding sleeve upon the hub of one of the friction members; that hub; a connector member mounted upon the friction member carrying the sleeve; connections between the sliding sleeve and the connector member; a relatively weak spring abutting upon the friction member carrying the sleeve to actuate the sleeve to throw the connector member into connecting position; a relatively strong spring pressing the friction member carrying the sleeve into engagement with the other friction member, and means to shift the sliding sleeve against its spring and then shift the friction member against its spring and to hold the sleeve against its spring while permitting the clutch spring to throw the clutch member.

2. In a clutch, two main friction members, the driving member and the driven member, one member slidably connected to one shaft and the other connected to another shaft; a sliding sleeve upon the hub of the slidable friction member; that hub; a connector member mounted upon the slidable friction member; connections between the sliding sleeve and the connector member; a relatively weak spring abutting on the slidable friction member and pressing the sliding sleeve forward to throw the connector member into connecting position; a relatively strong spring pressing the slidable friction member into engagement with the other friction member and means to shift the sliding sleeve against its spring and then shift the slidable friction member against its spring and to hold the sliding sleeve against its spring while permitting the clutch spring to throw the slidable clutch member.

3. In a clutch, male and female friction members, the female member secured to one shaft and having a shaft extension 4 upon which the male member is mounted; a hub extension on the male member; a sliding sleeve upon the hub extension; a connector member mounted upon the male friction member; an aperture in the inner face of the female member to coöperate with the connector member; connections between the sliding sleeve and the connector member; a relatively strong spring abutting upon the shaft extension and pressing the male clutch member with its hub extension against the female clutch member; a relatively weak spring abutting upon the hub extension and pressing the sliding sleeve forward to throw the connector member; means to shift the sliding sleeve against its spring and the male member against its spring, and to hold the sliding sleeve against its spring while permitting the clutch spring to throw the slidable clutch member.

4. In a clutch, a male driven and female driving friction members; a movable connecting member mounted upon the male friction member; a hub extension upon the male member; a spring pressing the male clutch member into engagement with female clutch member; a sleeve slidably mounted upon the hub extension; lever connections between the sleeve and the connecting member, all organized substantially as described, to permit the connecting member to be shifted out of engagement with the female member before the clutch members are disengaged and to permit the clutch members to engage before the connecting member is shifted to engage the female member.

Signed by me at Boston, Massachusetts this fifth day of October 1906.

OLIVER R. MITCHELL.

Witnesses:
JOSEPH T. BRENNAN,
CHARLES D. WOODBERRY.